3,194,768
PRODUCTION OF STORAGE STABLE ACTIVE OXYGEN CONTAINING LIQUID CONCENTRATES
Kurt Lindner and Elfriede Eichler, Berlin-Lichterfelde, Germany, assignors to Henkel & Cie G.m.b.H., Dusseldorf-Holthausen, Germany, a German corporation
No Drawing. Filed June 30, 1961, Ser. No. 120,922
Claims priority, application Germany, July 7, 1960, L 36,504
2 Claims. (Cl. 252—186)

The present invention relates to the production of storage-stable active oxygen-containing liquid concentrates, and more particularly to such concentrates containing an alkylene oxide adduct of an organic compound having a saturated alkyl group containing an active hydrogen atom, together with an acid stabilized aqueous peroxide solution.

It is known that aqueous solutions of active-oxygen-containing compounds, as for example, hydrogen peroxide, carbamide perhydrate, borate perhydrate, phosphate perhydrates, carbonate perhydrates, silicate perhydrates, and the like may be only insufficiently if at all stabilized where present in concentrated aqueous solutions, insofar as such concentrates are maintained at neutral to alkaline pH. It is impossible to maintain such concentrates stable in storage for extended periods of time up to weeks or months, as is sometimes necessary or desired for industrial purposes. Consequently, the higher concentrated hydrogen peroxide solutions and solutions of other perhydrates, as a rule, are only stabilized with acids, wherein normally the pH values are adjusted to between 1 and 3. The dissociation of hydrogen peroxide is offset in this manner, such that decomposition is prevented. As acid stabilizing agents which maintain the pH within the desired range, conveniently various inorganic and organic acids are used, for example phosphoric acid, pyrophosphoric acid, polyphosphoric acid, sulfuric acid, hydrochloric acid, oxalic acid, benzoic acid, salicylic acid, citric acid, tannic acids, aromatic sulfonic acids, such as benzylsulfonic acid, naphthalene sulfonic acid, toluene or xylene sulfonic acids, as well as the corresponding disulfonic acids. Moreover, other acids have been used, but in particular, it has been found that acid salts of stronger acids are well suited. Among these are alkali-bisulfates, alkali-monosodium phosphates, acid alkali-pyrophosphates, sodium metaphosphate, and alkali polyphosphates, such salts being suitably maintained in acid range.

It is an object of the present invention to overcome the foregoing difficulty and to provide for the production of storage-stable active oxygen-containing liquid concentrates including an acid stabilized aqueous peroxide together with an alkylene oxide adduct of an organic compound having a saturated alkyl group containing an active hydrogen atom.

Other and further objects of the invention will become apparent from a study of the within specification and accompanying examples.

It has been found in accordance with the present invention that storage-stable active oxygen-containing liquid concentrates may be provided by admixing an acid stabilized aqueous peroxide solution with an alkyleneoxide adduct of an organic compound having a saturated alkyl group containing an active hydrogen atom and recovering the liquid concentrate formed. The adduct may be an alkyleneoxide adduct of a member selected from the group consisting of lauryl alcohol and alkyl phenols having from 9 to 13 alkyl carbon atoms. Preferably, the adduct contains from 5-16 ethoxyl groups in the molecule and the pH of the liquid concentrate formed is adjusted to between 2.5 and 6, and more preferably between 3 and 5.

Thus, in accordance with the invention, peroxide compounds may now be stabilized for extended periods of time in concentrated aqueous solution, beyond those periods for which stabilization was effective using acids, acid salts, and the like in accordance with conventional techniques. The alkyleneoxide adducts of the invention are not, or at most only slightly, oxidizable compounds and therefore do not act detrimentally upon the stability of the peroxide content. The alkyleneoxide adducts may be considered polyethers of the same or mixed addition products, obtained by the addition of the alkyleneoxide, i.e. ethylene oxide, propylene oxide, etc. to nonoxidizable organic compounds having active hydrogen atoms.

Particularly suited, in accordance with the invention, are the surface-active adducts of ethylene oxide and an organic compound having a saturated alkyl group containing an active hydrogen atom which is selected from the group consisting of lauryl alcohol and alkyl phenols having from 9 to 13 alkyl carbon atoms.

In this connection, addition products of ethylene oxide with higher molecular alkyl phenols have been found to be very serviceable, such as, for example, nonyl phenol, dihexyl cresol, dodecyl phenol, and decyl xylenol.

In accordance with the invention, adducts of ethylene oxide and condensation products of propylene oxide with propylene glycol are contemplated, such as those which are considered technically under the designation Pluronics.

The degree of ethoxylation of the stabilization agents or adduct compounds, in accordance with the invention is not crititcal for carrying out the present invention, insofar as complete water solubility of the compounds is concerned. However, such ethylene oxide adducts are particularly suited, which simultaneously possess good wetting and washing capacities and which, due to these properties, permit the later introduction of the perhydrate concentrates for bleaching and washing purposes. In particular, compounds of this kind contain as a rule between 5–16 ethoxyl groups.

The polyether addition compounds, in accordance with the invention, advantageously provide not only an improvement in the stability and over-all stability in storage of active oxygen-containing concentrates, but also the possibility of maintaining higher pH values than were otherwise generally considered in the past in stabilizing such concentrates with acids alone. Significantly, satisfactory stabilizations are achieved where the pH value is maintained between 2.5 and 6, and preferably between 3 and 5. Accordingly, where the perhydrate concentrates are added to a washing solution, which will normally be within the alkaline range, a needless excess of neutralizing agents will be avoided.

In the following table of examples, the composition of a suitable hydrogen peroxide concentrate is indicated, which in the case of examples 1 and 2 is used in the presence of an alkyleneoxide adduct, whereas in the case of Example 3, the concentrate is merely acidified. The percent of ovygen losses, in each instance, were ascertained analytically after a storage period of 3, 7, and 12 weeks respectively. The particular concentrates used in the examples were stored in flasks of polyethylene oxide at an average room temperature of 20–22 degrees C.

| Examples | 1 | 2 | 3 |
|---|---|---|---|
| Nonylphenol +13 ethylene oxide | 5.0 | | |
| Laurylalcohol +9 ethylene oxide | | 5.0 | |
| Potassium toluene sulfonate | 0.3 | 0.3 | |
| $Na_2H_2P_2O_7$ | 5.5 | 5.5 | 5.5 |
| $H_2O_2$ 30% | 30.0 | 30.0 | 30.0 |
| Distilled water | 59.2 | 59.2 | 64.0 |
| pH-value | 3.50 | 3.32 | 3.24 |
| Percent oxygen losses: | | | |
| After 3 weeks | 0.06 | 0.04 | 3.88 |
| After 7 weeks | 2.29 | 3.72 | 9.32 |
| After 12 weeks | 3.56 | 4.22 | 17.4 |

In accordance with the foregoing, it will be seen that the losses of active oxygen are very small in the case of Examples 1 and 2, which reflect the improvement of the invention, while the losses of active oxygen are very great in Example 3 which indicates the results with a conventional preparation. In the preparations stored in accordance with Examples 1 and 2, it was not possible to detect an oxygen excess pressure within the completely closed flasks. The same result was found when the preparations were enclosed within packets. The small losses indicated in the foregoing table are, therefore, probably caused through the oxidation of impurities present within the container. In contrast thereto, in the storing of the concentrate prepared according to Example 3, an oxygen excess pressure gradually occurs which is comparatively great considering the conditions of practice.

In a corresponding manner, the higher concentrated solutions of perhydrates salts, such as carbamide perhydrate, borate perhydrates, phosphate perhydrates, carbonate perhydrates, silicate perhydrates, and the like, may also be stabilized and stabilized for extended periods in storage, in the same manner as the hydrogen peroxide concentrates. It will be appreciated that instead of the acids or acid salts mentioned above as acid stabilizing agents for the peroxide or perhydrate contents, acid perhydrates may be employed, such as, for example potassium acid pyrophosphate perhydrate, the same performing the dual role of a perhydrate and a self-contained acid stabilizer therefor.

It will be appreciated that the present invention is not limited to concentrates having any particular hydrogen peroxide concentration. Thus, by 100% hydrogen peroxide, higher concentrated hydrogen peroxide solutions may be prepared having $H_2O_2$ contents of from 60–80%. This may be carried out by decreasing the amount of water present or by both decreasing the amount of water and employing a highly concentrated initial hydrogen peroxide. Concentrates obtained in this manner will, therefore, have very high $H_2O_2$ contents, yet the same will be effectively stable in storage over extended periods of time. Nevertheless, it is possible and even desirable to produce liquid concentrates having lower $H_2O_2$ contents. The concentrates in accordance with the invention may have $H_2O_2$ contents which generally range between 2.5 and 75% while the alkyleneoxide adduct substituents may range between 1 and 20% based upon the amount of concentrate present. The concentrate preparations set forth in examples 1 and 2 are suitable for washing and bleaching purposes in a quantity of about 4% concentrate, based upon the dry fibre employed.

The concentrate products obtained in accordance with the present invention may be used as bleaching agents and simultaneously as active washing concentrates not only in commercial, industrial, and household laundries, but also in textile finishing and general cleaning purposes, as well as for disinfecting and cosmetic purposes. It is only necessary to standardize the concentrates before use to the desired pH, i.e. alkalinity, or, for example, to produce by correspondingly adjusted more strongly alkaline washing and/or cleaning agent preparations, mixtures, or dilutions, which possess the desired degree of alkalinity.

Of course, the previously acidified concentrates of the peroxide and adduct in accordance with the invention may be attained by means of any suitable acid as aforesaid, such as various inorganic and organic acids, i.e., phosphoric acid, polyphosphoric acid, sulfuric acid, hydrochloric acid, oxalic acid, benzoic acid, salicylic acid, citric acid, tannic acids, aromatic sulfonic acids, such as benzylsulfonic acid, naphthalene sulfonic acid, toluene or xylene sulfonic acids, as well as the corresponding disulfonic acids. In particular, it has been found that acid salts of stronger acids are well suited. Among these are alkali-bisulfates, alkali-monosodium phosphates, acid alkali-pyrophosphates, sodium metaphosphate, and alkali polyphosphates, such salts being suitably maintained in acid range.

What is claimed is:

1. In the process of storing active oxygen-containing aqueous concentrates, the improvement for attaining extended periods of storage stability at a concentrate pH between 2.5 and 6 which comprises storing an acid stabilized aqueous hydrogen peroxide solution, having a peroxide content between about 2.5 and 75%, in admixture with between about 1 and 20%, based on the total concentrate, of a water-soluble adduct of ethylene oxide with an organic compound having a saturated alkyl group containing an active hydrogen atom and which is selected from the group consisting of lauryl alcohol and alkyl phenols having from 9 to 13 alkyl carbon atoms, as the aqueous concentrate, said adduct having from 5 to 16 ethylene oxide groups in the molecule and the pH of the aqueous concentrate being maintained between 2.5 and 6.

2. The process of claim 1 wherein the pH of the aqueous concentrate is maintained between about 3 and 5.

References Cited by the Examiner

UNITED STATES PATENTS

| 946,529 | 1/10 | Arndts | 23—207.5 |
| 1,002,854 | 9/11 | Liebknecht | 23—207.5 |
| 1,058,070 | 4/13 | Liebknecht | 23—207.5 |
| 2,371,545 | 3/45 | Riggs et al. | 252—95 XR |
| 2,886,532 | 5/59 | Richmond et al. | 252—186 XR |

FOREIGN PATENTS

| 207,905 | 5/57 | Australia. |
| 1,063,155 | 4/54 | France. |
| 1,016,241 | 9/57 | Germany. |
| 399,040 | 9/33 | Great Britain. |
| 761,043 | 11/56 | Great Britain. |

JULIUS GREENWALD, *Primary Examiner.*